United States Patent [19]

Fukui et al.

[11] Patent Number: 5,298,315
[45] Date of Patent: Mar. 29, 1994

[54] COMPOSITE NONWOVEN FABRIC

[75] Inventors: Minoru Fukui, Suita; Toshiko Kiyotaki, Kawanishi, both of Japan

[73] Assignee: Asahi Kasei Kogyo Kabushiki Kaisha, Osaka, Japan

[21] Appl. No.: 79,859

[22] Filed: Jun. 22, 1993

Related U.S. Application Data

[63] Continuation of Ser. No. 968,066, Oct. 29, 1992, abandoned.

[30] Foreign Application Priority Data

| May 2, 1991 | [JP] | Japan | 3-100794 |
| May 1, 1992 | [JP] | Japan | 4-112026 |
| Jun. 3, 1992 | [JP] | Japan | 4-142776 |

[51] Int. Cl.$^5$ ............................................. B32B 5/06
[52] U.S. Cl. ............................ 428/298; 428/284; 428/286; 428/287; 428/297; 428/299; 428/904; 428/904.4; 428/913
[58] Field of Search ............ 428/284, 286, 287, 297, 428/298, 299, 904, 904.4, 913

[56] References Cited

U.S. PATENT DOCUMENTS

| Re. 31,601 | 6/1984 | Ikeda et al. | 428/93 |
| 3,451,885 | 6/1969 | Klein | 161/80 |
| 4,190,695 | 2/1980 | Niederhauser | 428/234 |
| 4,426,421 | 1/1984 | Nakamae et al. | 428/234 |
| 4,442,161 | 4/1984 | Hirayoglu et al. | 428/219 |
| 4,476,186 | 10/1984 | Kato et al. | 428/289 |
| 4,612,228 | 9/1986 | Kato et al. | 428/151 |
| 4,879,170 | 11/1989 | Radwanski et al. | 428/301 |
| 4,939,016 | 7/1990 | Radwanski et al. | 428/913 |
| 5,175,042 | 12/1992 | Chomarat | 428/299 |

FOREIGN PATENT DOCUMENTS

| 1123589 | 5/1982 | Canada . |
| 1560746 | 9/1970 | Fed. Rep. of Germany . |

*Primary Examiner*—James J. Bell
*Attorney, Agent, or Firm*—Finnegan, Henderson, Farabow, Garrett & Dunner

[57] ABSTRACT

A composite nonwoven fabric comprising a staple fiber nonwoven fabric A constituted with a staple fiber of 0.3 denier or less and a staple fiber of 0.5 denier or more, the content of which is determined to a specific value, and a filament nonwoven fabric B. With regard to the fiber arrangement of the staple fiber in the staple fiber nonwoven fabric A, the proportion of a parallel component thereof against a surface of the nonwoven fabric is high, and the staple fiber nonwoven fabric A and the filament nonwoven fabric B are interlaced with each other near the boundary area therebetween, and the staple fiber of the staple fiber nonwoven fabric A is not deeply inserted. The composite nonwoven fabric has superior air permeability and water resistance and when deformation caused by bending or compression occurs, a leakage of liquid is not likely to occur.

6 Claims, 6 Drawing Sheets

COMPOSITE NONWOVEN FABRIC

This application is a continuation of application Ser. No. 07/968,066, filed Oct. 29, 1992, now abandoned.

DESCRIPTION

1. Technical Field

The present invention relates to a nonwoven fabric having superior air permeability and water resistance that can be used for surgical wear, diapers, filters or the like.

2. Background Art

Various characteristics have been required of nonwoven fabrics in response to increased application of nonwoven fabrics. One of the said requirements is superior air permeability and water resistance. Essentially, air permeability is a characteristic contrary to that of water resistance. It is required that many through holes extending from the front surface of a nonwoven fabric to the back surface thereof are provided in the nonwoven fabric so as to improve air permeability, but when air permeability is improved, a lowering of the water resistance cannot be avoided.

When the nonwoven fabric is used for medical use such as surgical wear, it is required to have greater bacteria barrier properties, i.e., greater water resistance is required to protect the wearer from infection. Further it is necessary that blood or the like does not permeate the nonwoven fabric when a deformation caused by bending or compression of the garment occurs. While superior air permeability is required to minimize perspiration and not to accumulate moisture.

A composition of two different types of fabrics has been proposed to satisfy these two mutually contradictory properties, air permeability and water resistance.

For example, Japanese Unexamined Patent Publication (Kokai) No. 64-61555 discloses a technique of manufacturing a composite sheet by paper-making a dispersion liquid including two type staple fibers having different fineness on a knitted fabric having potential shrinkability and sufficiently interlacing the staple fibers themself and to the knitted fabric in a water jet streams. This composite sheet has superior air permeability but water resistance of the composite sheet is inferior. Japanese Unexamined Patent Publication (Kokai) No. 1-111056 discloses a composite nonwoven fabric comprising a nonwoven fabric composed of a pulp and a staple fiber, and a filament nonwoven fabric. Although it states that this composite nonwoven fabric can be used for surgical wear in the publication, it does not appear that the water resistance thereof has significantly improved.

The above-described nonwoven fabric is likely to allow leakage of a liquid when subjected to bending or compression.

DISCLOSURE OF THE INVENTION

The objected of the present invention is to provide a nonwoven fabric attaining sufficient air permeability and water resistance, a little leakage of liquid when subjected to deformation caused by bending, or compression or the like, and superior in strength and flexibility.

The object of the present invention can be attained by a composite nonwoven fabric comprising a staple fiber nonwoven fabric (A) having the following constitutions (1) to (3) and a filament nonwoven fabric (B) formed such that filaments are partially bonded with each other, wherein a part of the staple fibers constituting the staple fiber nonwoven fabric (A) are inserted into the filament nonwoven fabric (B) and interlaced with the filaments constituting the filament nonwoven fabric (B) so as to produce an layered body of the staple fiber nonwoven fabric (A) and a filament nonwoven fabric (B), and the number N of the staple fibers inserted to a depth of one to two or more of the thickness of the filament nonwoven fabric (B) in a region having a length of 500 μm in an optional cross section of the composite nonwoven fabric is 20 or less;

(1) $F + S \geq 50\%$ by weight
$1/7 \leq F/S \leq 4/3$
wherein:
  F: ratio of a staple fiber having a fineness of 0.3 denier or less in all the staple fibers
  S: ratio of a staple fiber having a fineness of 0.5 denier or more in all the staple fiber
(2) Weight per unit area of the staple fibers: 10 g/m² to 40 g/m²
(3) Mean orientation degree: 2.0 to 10

DESCRIPTION OF THE PREFERRED EMBODIMENTS

The present invention will be described hereinafter in connection with the accompanying drawings showing an example of a composite nonwoven fabric in accordance with the present invention.

Figure 1:
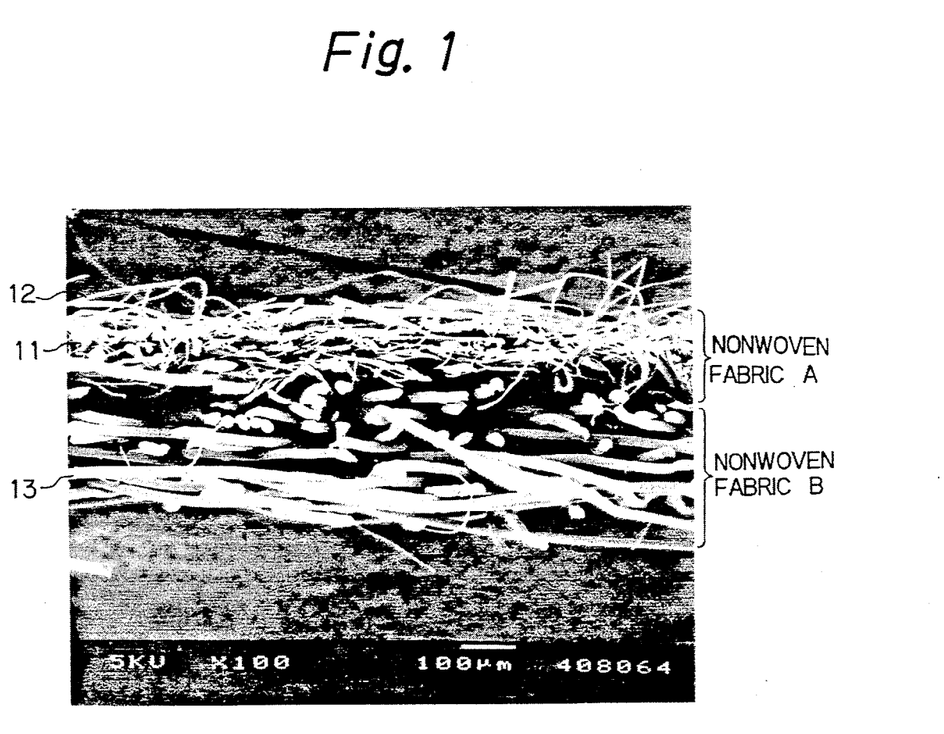
FIG. 1 is an electron micrograph of a cross section of an example of a composite nonwoven fabric in accordance with the present invention.
Figure 2:
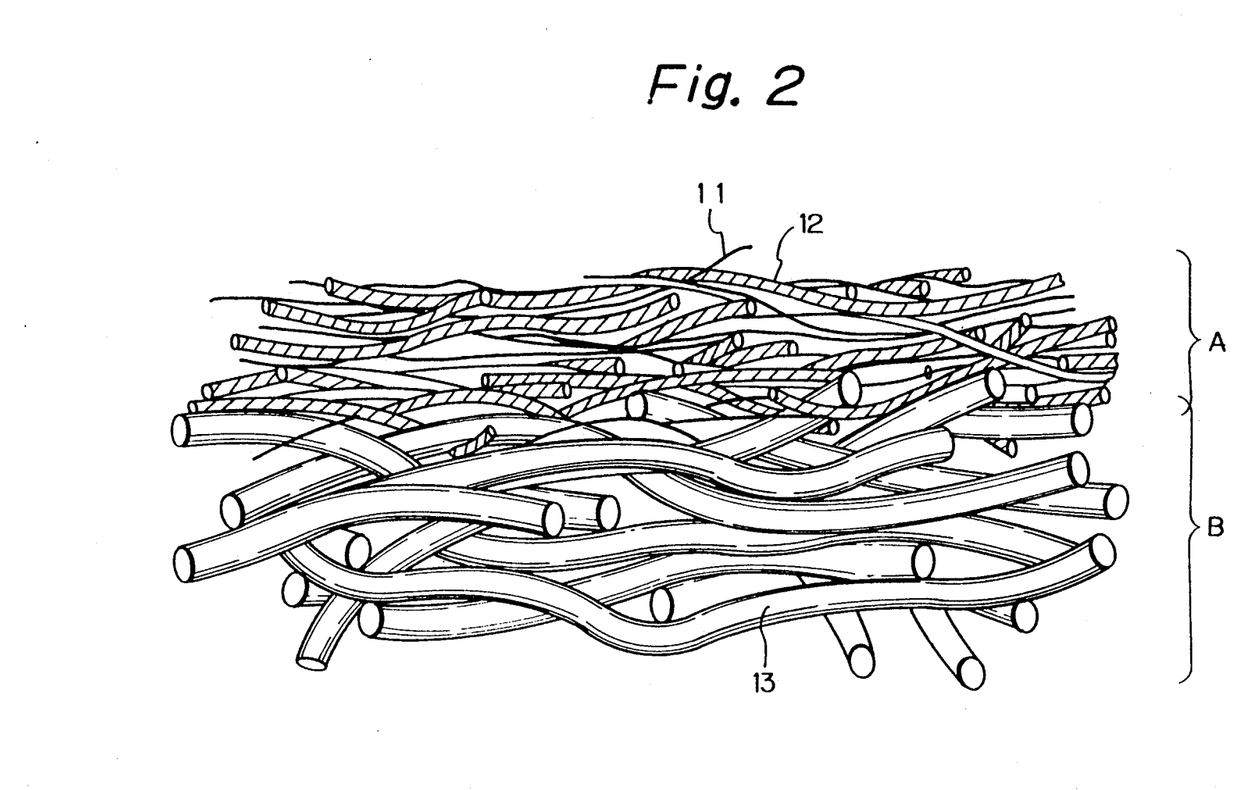
FIG. 2 is a schematic cross sectional view of the composite nonwoven fabric shown in FIG. 1.
Figure 3:
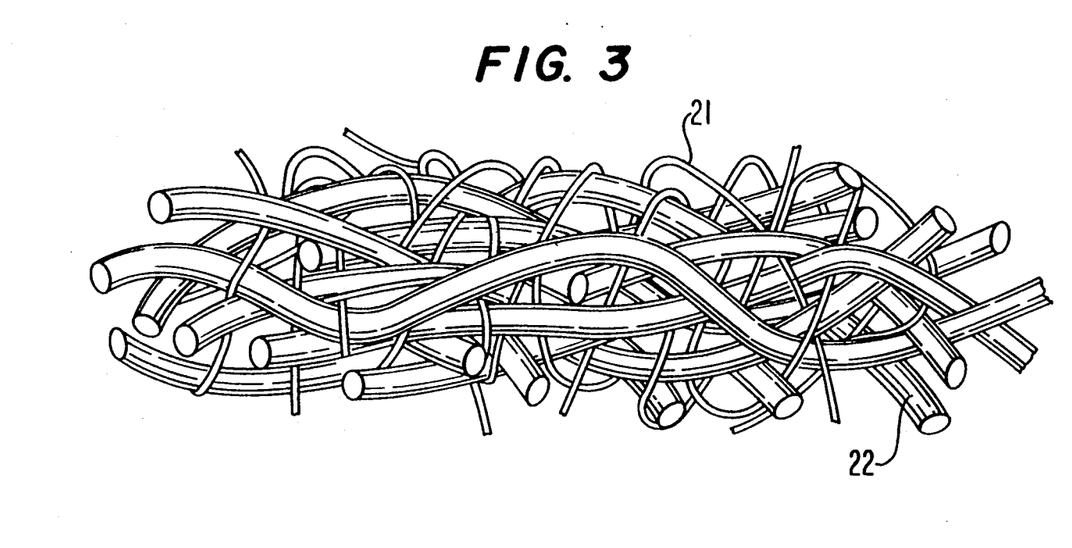
FIG. 3 is a schematic cross sectional view of a conventional composite nonwoven fabric.

FIG. 1 shows an electron micrograph of a cross sectional view of an example of a composite nonwoven fabric in accordance with the present invention and FIG. 2 shows a corresponding schematic cross sectional view of the composite nonwoven fabric shown in FIG. 1. FIG. 3 shows a schematic cross sectional view of a conventional and typical composite fabric. As shown in FIGS. 1 and 2, a composite nonwoven fabric is comprised of a staple fiber nonwoven fabric A comprising staple fibers 11 having a fineness of $0.3^d$ or less and staple fibers 12 having a fineness of $0.5^d$ or more and a filament nonwoven fabric B. A plurality of staple fibers in the staple fiber nonwoven fabric A are arranged in a relatively parallel plane on a surface of the composite nonwoven fabric, and the staple fibers in the staple fiber nonwoven fabric A and the filaments in the filament nonwoven fabric B are only interlaced at the boundary face between them, and further, the staple fibers in the staple fiber nonwoven fabric A is not deeply inserted inside the filament nonwoven fabric B. In the conventional composite nonwoven fabric shown in FIG. 3, staple fibers 21 constituting a staple fiber nonwoven fabric C are deeply inserted inside a filament fiber nonwoven fabric D by a column-like liquid stream under high pressure and thus the staple fibers 21 are highly interlaced with filaments 22 constituting a filament nonwoven fabric. Accordingly, although the composite nonwoven fabric shown in FIG. 3 is formed by the two nonwoven fabrics, the obtained composite nonwoven fabric attains an appearance similar to a single nonwoven fabric formed by mixing the staple fiber 21 with the filaments 22.

A first feature of the composite nonwoven fabric in accordance with the present invention is that the sum of the ratio F of a staple fiber having a fineness of 0.3 denier or less and the ratio G of staple fiber having a fineness of 0.5 denier or less is 50% by weight or more in the staple fiber nonwoven fabric A, the ratio of F/G is one to seven or more and four to three or less, and a weight per unit area of the staple fiber nonwoven fabric A is between 10 g/m$^2$ and 40 g/m$^2$. A fineness of the staple fiber 11 is 0.3 denier or less, preferably 0.15 denier or less and 0.001$^d$ or more. It is unnecessary for all of the staple fiber 11 to have the same fineness, and the staple fiber 11 can be prepared by cutting the fiber, for example, removing a sea composition from a sea-island fiber, separating or splitting a composite fiber having two or more components, or an extrafine fiber obtained by a direct spinning method or the like. A fineness of the staple fiber 12 is 0.5$^d$ or more, preferably, 0.75 denier or more and 10 denier or less. It is unnecessary for all of the staple fiber 12 to have the same fineness, and it is preferable that the fiber length of the staple fiber 11 and the staple fiber 12 be greater than the thickness of the composite nonwoven fabric, but it is unnecessary for the staple fiber 11 and the staple fiber 12 to be the same fiber length.

The staple fiber 11 contributes to an improvement in the water resistance of the composite nonwoven fabric, but when the content of the staple fiber 11 in all of the staple fibers of the staple fiber nonwoven fabric A is increased, air permeability is lowered. The staple fibers 12 have a reverse function to that of the staple fibers 11. Accordingly, when F/G is one to seven or more and four to three or less, the staple fibers 11 and 12 have superior balance, and thus the composite nonwoven fabric attains superior air permeability without lowering water resistance. However, it is necessary that the sum of F and G is 50% by weight or more and when the sum of F and G is under 50% by weight, it is difficult to obtain a superior effect. It is preferable that the sum of F and G is 70% by weight or more.

It is necessary that the weight per unit area is 10 g/m$^2$ or more and 40 g/m$^2$ or less. When the weight per unit area is over 40 g/m$^2$, the air permeability of the composite nonwoven fabric is lowered and when the weight per unit area is under 10 g/m$^2$, the water resistance of the composite nonwoven fabric is lowered.

It is preferable that the apparent density of the staple fiber nonwoven fabric A is 0.1 g/m$^2$ so as to improve the water resistance of the composite nonwoven fabric. A method for measuring the apparent density of the nonwoven fabric will be described hereafter.

A second feature of the composite nonwoven fabric is that a mean orientation degree Z of the staple fibers in the staple fiber nonwoven fabric A is 2.0 or more and 10 or less. The mean orientation degree Z is a value indicating the ratio between a component parallel to the surface of the filament nonwoven fabric B and a component perpendicular to the surface of the filament nonwoven fabric B in the staple fiber of the staple fiber nonwoven fabric A. A method of manufacturing the average orientation degree will be described hereafter.

Figure 6:
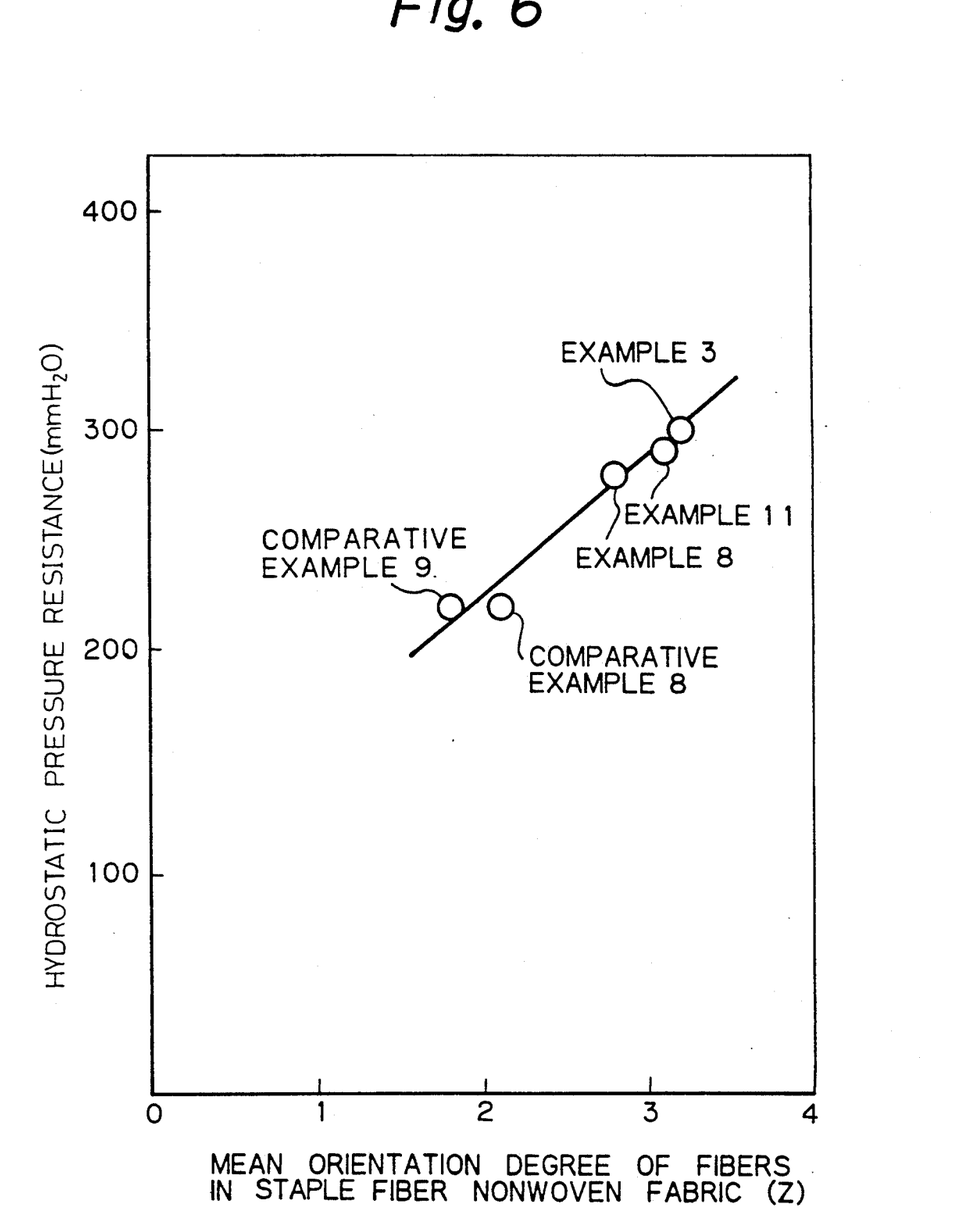
FIG. 6 is a graph illustrating a relationship between the mean orientation degree of staple fibers and the water resistance of the nonwoven fabric.

The inventors in the present application found that leakage of a liquid caused by a deformation generated by applying bending and compression forces to the composite nonwoven fabric is dependent on the value of the mean orientation degree Z. FIG. 6 shows a graph illustrating a relationship between the mean orientation degree of the staple fiber and the water resistance of the nonwoven fabric. As can be seen from the graph of FIG. 6, it is apparent that there is a clear linear correlation between the mean orientation degree Z of the staple fiber and the water resistance of the nonwoven fabric having the same composition and weight per unit area. Even if bending or compression forces are applied to the composite nonwoven fabric, the leakage of liquid can be effectively prevented and results in a composite nonwoven fabric with superior water resistance. When the mean orientation degree Z is over 10, an interlacement between the staple fibers constituting the staple fiber nonwoven fabric A and the interlacement between the staple fiber nonwoven fabric A and the filament nonwoven fabric B decrease and result in a composite nonwoven fabric with less strength.

Accordingly, it is necessary to determine the average orientation degree to a range of 2.0 to 10, preferably 2.3 to 10, more preferably 2.5 to 8.0.

A third feature of the composite nonwoven fabric in accordance with the present invention is that a number N of the staple fibers inserted to a depth of one to two or more of the thickness of the filament nonwoven fabric B in a region having a length of 500 μm is an optional cross section of the composite nonwoven fabric is 20 or less. A method of measuring the number N is described hereafter, and when the number N is over 20, the water resistance of the composite nonwoven fabric is lowered.

As described herebefore, the object of the present invention can be attained by integrating the staple fiber nonwoven fabric A having a specific constitution with the filament nonwoven fabric B.

A nonwoven fabric manufactured by a spun bond method can be used as the filament nonwoven fabric B. Filaments constituting the filament nonwoven fabric B are partially bonded to each other by heat fusing or using an adhesive to fix a structure thereof. Since it is impossible for the bound portions in the filament nonwoven fabric B to interlace with the staple fibers in the staple fiber nonwoven fabric A, it is preferable that the area ratio of the total area of the bound portions to the total surface area of the filament nonwoven fabric B is between 2% and 20% and a filament having a fineness of 0.5 denier is preferably used, and when an average of breaking elongations measured in two directions at right angle is 40% or less, the staple fiber can easily adopt the above arrangement when interlacing the two nonwoven fabrics.

Any kinds of fibers can be used for the composite nonwoven fabric in accordance with the present invention. For example, A thermoplastic fiber such as a polyamide group fiber, a polyester group fiber, a polyolefine group fiber, a polyacrylonitrile group fiber or the like, an acetate group fiber, a regenerated cellulose group fiber or the like can be used. Further, if necessary, a natural cellulose fiber, a wool fiber or the like can be used, and when the regenerated cellulose group fiber is used for the staple fiber nonwoven fabric A, locuses of a water jet stream used for an interlacing process and openings generated by the water jet stream are easily removed and thus it is possible to prevent a lowering of the water resistance.

When the polyester fiber is used in the staple fiber nonwoven fabric A, the interlacement between the filament nonwoven fabric B and the staple fiber nonwoven fabric A is enhanced. Accordingly, specific features can be attained as a result of using the regenerated cellulose group fiber and the polyester group fiber when the polyester group fiber having a rate between one to three or more and one or less for the regenerated cellulose group fiber having a rate of one is used.

Further it is preferable that a fibrillated pulp-like fiber of between 5% by weight and 15% by weight for all the staple fibers in the staple fiber nonwoven fabric A be used in addition to a staple fiber having a fineness of 0.3 denier or less and a staple fiber having a fineness of 0.5 denier or more to obtain the composite nonwoven fabric with a water resistance and a tensile strength of which are slightly improved without lowering air permeability. The fibrillated pulp-like fiber can be obtained by beating a natural pulp or a splitable acrylic fiber.

A method for manufacturing the composite nonwoven fabric in accordance with the present invention will be described hereafter.

A staple fiber of 0.3 denier or less and a staple fiber of 0.5 denier or more are dispersed at predetermined mixing ratios to water, and a staple fiber nonwoven fabric A is obtained by paper-making the dispersion liquid. In this case, it is preferable to add an interfacial active agent to the dispersion liquid to improve dispersion of the fibers in the water. Next, a filament nonwoven fabric B manufactured by a spun bond method is layered on the staple fiber nonwoven fibric A. The layered body may be manufactured by directly paper-making the staple fibers constituting the staple fiber nonwoven fabric A on the filament nonwoven fabric B.

The layered body is integrated by a column-like stream. Namely a wire mesh of 50 to 200 mesh is arranged between the layered body mounted on a conveyor of wire mesh and a nozzle, and water jet stream having a pressure of 30 kg/cm$^2$ or less is injected through the wire mesh of 50 to 200 mesh onto the layered body from the nozzle rotating at 50 to 1000 r.p.m. The nozzle having a plurality of holes with diameters between 0.05 mm and 0.3 mm may generally be used. The mean orientation degree of the staple fiber in the staple fiber nonwoven fabric A can be controlled in the desirable range described herebefore by inserting the wire mesh between the nozzle and the conveyor and suitably rotating a nozzle and controlling the pressure of the nozzle, and thus the composite nonwoven fabric having superior air permeability and water resistance can be attained.

It is preferable to further apply a water repellent treatment to the composite nonwoven fabric to obtain a composite nonwoven fabric having good water resistance. As a known water repellent agent, for example, a silicone group water repellent agent such as dimethylaminosilicone or the like, or a fluorine group water repellent agent such as perfluoroarylate or the like can be used and the accumulation solid portion of the water repellent agent is preferably around 0.1%–5% of the weight of the composite nonwoven fabric.

Methods for measuring characteristics used for evaluating a composite nonwoven fabric in accordance with the present invention will be described hereinafter.

Figure 4:
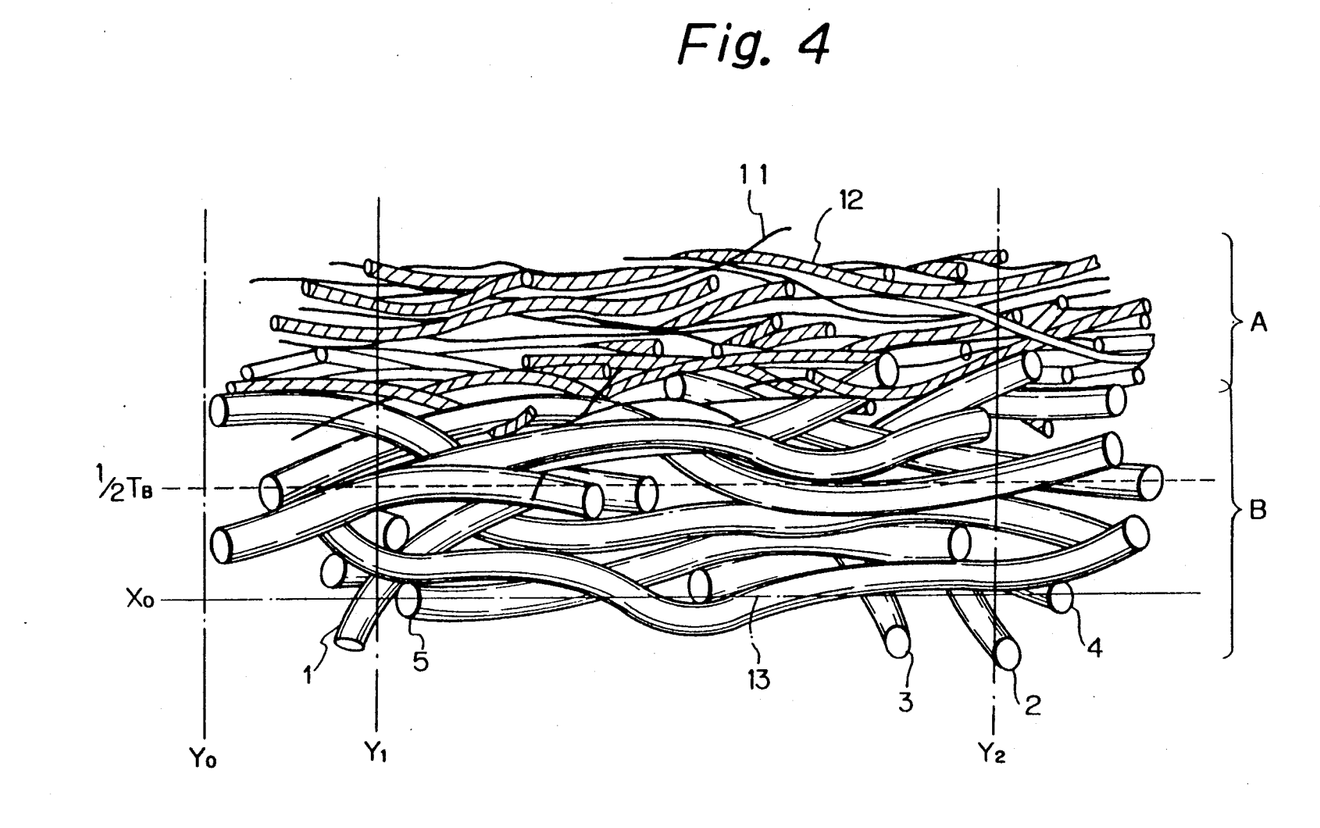
FIG. 4 is the same schematic cross sectional view of the composite nonwoven fabric of FIG. 2, except that standard lines $X_0$ and $Y_0$ are added.
Figure 5:
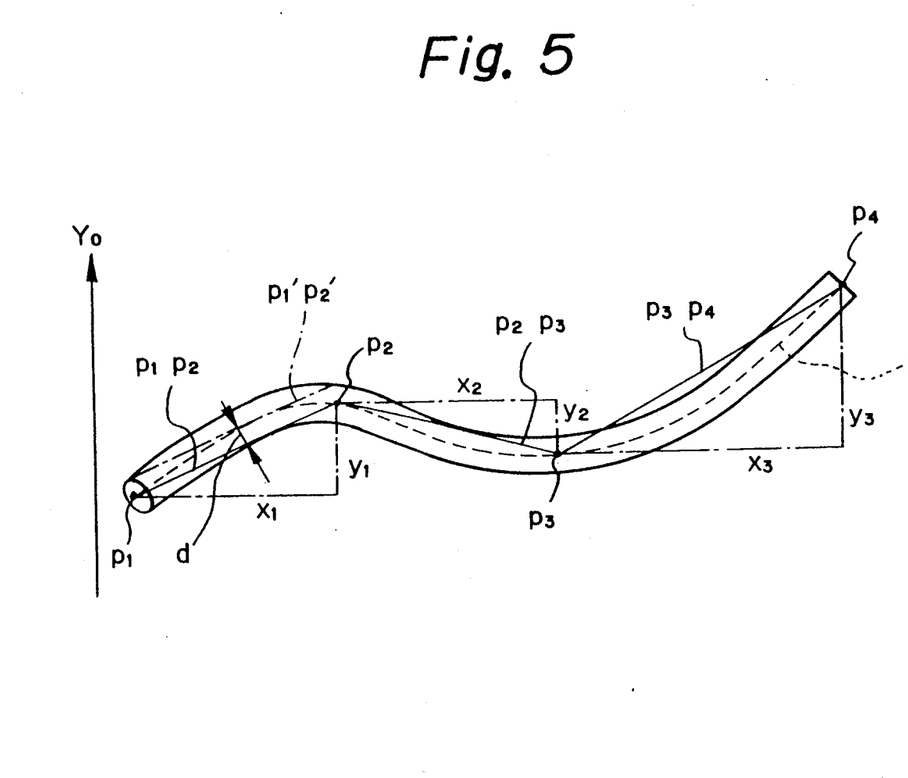
FIG. 5 is a view defining a straight line component to be used for a measurement of a mean orientation degree (Z) of fibers.

Method For Measuring Means Orientation Degree Of Staple Fibers In A Staple Fiber Nonwoven Fabric A 1. A test piece having a size of 20 cm square is cut from the composite fiber nonwoven fabric.
2. The test piece is cut every 5 cm in a longitudinal direction and a traverse direction so as to obtain 16 segments having a size of 5 cm square.
3. Three segments are optionally selected from 16 segments.
4. An electron micrograph with a magnification of 100 is taken of a cross section of a selected segment. At that time, the micrograph is taken of a portion not having a partial bonding portion in the filament nonwoven fabric B in two adjacent sides of each segment and thus six micrographs are prepared.
5. As shown in FIG. 4, the number of ends of filaments constituting the filament nonwoven fabric B in each electron micrograph is counted from an outside position distant from the surface of the filament nonwoven fabric B to the inside thereof; a straight line $X_0$ is drawn from the center of a cross section of a fourth end to the center of a cross section of a fifth end, which is arranged at a position distant from the fourth end by at least 300 $\mu$m. This line $X_0$ denotes a standard line of this composite nonwoven fabric. Another standard line $Y_0$ is drawn in a direction perpendicular to the standard line $X_0$.
6. Two vertical lines $Y_1$, $Y_2$ having a distance of 5 cm are drawn parallel to the standard line $Y_0$ in a middle portion of each electron micrograph.
7. A staple fiber having a fineness of 0.3 denier or less and a staple fiber having a fineness of 0.5 denier or more whose a length in a longditional direction thereof is 10 times the maximum diameter of the fiber are selected, respectively, between the vertical lines $Y_1$ and $Y_2$.
8. As shown in FIG. 5, $P_1$ denotes an optional point of a central line L of the staple fiber, a point $P_2$ is selected on the central line L and a straight line $P_1 P_2$ connecting the point $P_1$ with the point $P_2$. At that time, the point $P_2$ is determined in such a manner that when a straight line $P_1' P_2'$ tangent to the central line L is drawn, a distance d between the straight line $p_1 p_2$ and the tangent line $P_1' P_2'$ is less than the diameter r of the fiber, and a length between the point $p_1$ and the point $P_2$ is more than four times the diameter r.
9. The other points $P_3, P_4 \ldots P_n$ are determined according to the same procedure, and the staple fiber is separated to a plurality of straight lines. The procedures determing the points $P_1, P_2 \ldots P_n$ are applied to all of the staple fibers selected in the above step 7.
10. Components $X_n$ in a direction parallel to the standard line $X_0$ and components $Y_n$ in a direction parallel to the standard line $Y_0$ are obtained by applying a scalar analysis to the separated straight lines of each staple fiber, and the sum of values of $X_n$ and $Y_n$ are calculated to X and Y.
11. A ratio X/Y is calculated, and the mean orientation degree Z is determined as a mean value of X/Y obtained from six electron micrographs.

Method for Measuring A Number (N) of Staple Fibers Inserted Into A Filament Nonwoven Fabric B 1. The same three segments of the composite nonwoven fabrics and the same six electron micrographs as those used for the method for measuring the mean orientation degree Z are prepared.

2. Three filament nonwoven fabrics B are prepared by peeling the filament nonwoven fabric B from the three segments, respectively. A thickness of the filament nonwoven fabric B is measured at four points determined such that a distance between each point is at least 2 cm or more under a pressure of 1 g/cm$^2$ by applying a compression property measuring method of a KES-FB Testing System using a compression tester (KES-FB-M3, KES-FB-E3) supplied from KATO TECH CO., LTD., and the thickness TB of the filament nonwoven fabric B is determined as a mean value of the obtained twelve values of the thickness.

3. A straight line ½ TB parallel to the standard line $X_0$ and having a distance of a half value of TB obtained by the step 2 is drawn in the six electron micrographs, respectively.

4. A number of the staple fibers crossing the straight line ½ TB is counted between the vertical lines $Y_1$ and $Y_2$ having a distance of 500 μm, and the number N is determined as a mean value of the numbers obtained in the six electron micrographs.

Method For Measuring The Density of a Staple Fiber Nonwoven Fabric A

1. The same six electron micrographs as those used for the method for measuring the mean orientation degree Z are prepared.

2. Standard lines $X_1$ and $X_2$ are drawn along an upper surface and a lower surface of a staple fiber nonwoven fabric A by applying the same procedure as that used for drawing the standard line $X_0$ in the method for measuring the mean orientation degree. The segments of the vertical lines $Y_1$ and $Y_2$ made by intersecting the standard lines $X_1$ and $X_2$ are measured for the six electron micrographs, and a thickness T (μm) of the staple fiber nonwoven fabric A is determined as a mean value of the thickness obtained in the six micrographs.

3. A weight per unit area W (g/m$^2$) of the staple fiber nonwoven fabric A is obtained by measuring a weight per unit area of a composite nonwoven fabric according to JIS-L-1096 and subtracting the value of the weight per unit area of the filament nonwoven fabric B obtained in the method for measuring the number N of the staple fiber nonwoven fabric A from the weight per unit area of the composite nonwoven fabric.

4. The density of the staple fiber nonwoven fabric A is obtained by W/T (g/cm$^3$).

Bending Hardness

The bending hardness of the composite nonwoven fabric is measured according to a bending property measuring method of a KES-FB Testing System. The measurement is taken five times in a longitudinal direction corresponding to a direction along which a staple fiber nonwoven fabric A and a filament nonwoven fabric B are interlaced and in a traverse direction of the composite nonwoven fabric to a test piece by a pure bending tester supplied from KATO TECH CO., Ltd., and the bending hardness of the composite nonwoven fabric is determined as a mean value of the obtained values.

Air Permeability

Air permeability of the composite nonwoven fabric is measured by a fragile type test according to JIS-L-1096, and expressed by a mean value of five measurements.

Breaking Strength

The breaking strength of the composite nonwoven fabric is measured according to JIS-L-1096. First, a test sample having a width of 3 cm and a distance of 10 cm between two gripping points is prepared, and the breaking strength is measured by Tensilon UTM-1 supplied from TOYO BALDWIN CO., LTD., and expressed by a mean value (kg/cm) of five measurements.

Breaking Elongation

A breaking elongation of the composite nonwoven fabric is measured using the same procedure as that used to determine the breaking strength, and expressed by a mean value of five measurements.

Hydrostatic Pressure Resistance

Water resistance is measured by a lower hydrostatic pressure method applied to a sample having a hydrostatic pressure resistance of 1000 mmH$_2$O or less, according to JIS-L-1092, and expressed by a mean value (mmH$_2$O) of five measurements.

Meison Jar Test

A time (minute) from a time that a water column pressure of 114 mmH$_2$O of a physiologic saline is applied to a test piece of the composite nonwoven fabric to a time that leakage of a liquid starts is measured according to IST80, 7-70, MEISON JAR Method, and the result is expressed by a mean value of three measurements. A composite nonwoven fabric having a value of 60 minutes or more is acceptable in the Meison jar test.

Leakage Resistance When Subjected to Deformation as A Result of Compression or Bending A 10 cm square test piece is cut from the composite nonwoven fabric. Further Two 10 cm square plates, at the center of which is a hole having a diameter of 6 cm, are prepared, and the test piece is arranged between the two plates. A colored physiologic saline of 10 cc is poured on the center portion of the hole of an upper plate from a dropping pipette. The test piece with the two plates is mounted on a cylinder of an acrylic resin and has an inner diameter of 90 mm and an outer diameter of 100 mm, and the cylinder is set to Tensilon OTM-1 supplied from TOYO BALDWIN CO., LTD. so that a center portion of the test piece can be pushed in a reciprocating fashion by a bar with a surface having a curvature of 5 cm with a stroke of 20 mm. The pushing frequency of the bar is counted when the colored physiologic salin spreads over an under side of the test piece viewed through the acrylic cylinder. The liquid leakage resistance is evaluated as a mean value of five measurements.

The present invention will be described in detail on the basis of Embodiments of composite nonwoven fabrics in accordance with the present invention.

A following water repellent treatment is applied to all of the composite nonwoven fabrics in the Examples described hereafter and the characteristic of the composite nonwoven fabric are measured.

Water repellent: Asahi Guard Series AG-433 supplied from MEISEI KAGAKU Co., Ltd.

Treatment: A composite nonwoven fabric is immersed into a water solution containing 5% water repellent, dried at 100° C. for 2 minutes, and cured at 160° C. for one minute.

A compositing process of the layered bodies in the Examples is applied with a water jet stream. The main conditions of the water jet stream treatment are as follows:

The diameter of the orifices in the water jet stream injection nozzle: 0.2 mm

The distance between the nozzle and the composite nonwoven fabric: 30 mm

A wire net arranged at a middle position between the nozzle and the composite nonwoven fabric: wire net having 70 mesh Nozzle rotating condition:
Rotational radius: 6 mm
Rotational speed: 200 rpm

EXAMPLE 1

A predetermined amount of polyethylene terephthalate staple fiber having a fineness of 0.1 denier and a length of 5 mm, and a viscose rayon staple fiber having a fineness of 1 denier, a length of 5 mm and an amount similar to that of the polyethylene terephthalate staple fiber are dispersed into water and stirred to form a slurry having a concentration of 0.63%. A staple fiber nonwoven fabric A having a weight per unit area of 25 g/m$^2$ is obtained by paper making the slurry in an inclined wire net type paper making machine.

A filament nonwoven fabric B is prepared by melt spinning a polyethylene terephthalate polymer, drawing the molten polymer extruded from a spinning nozzle by an air sucker to make a uniform filament web, and heating and pressing the web using a pair of upper embossing rollers having a plurality of convex portions on a surface thereon and a lower roller having a smooth surface. The fineness of a filament of this filament nonwoven fabric B is 2 denier and the obtained filament nonwoven fabric B has a weight per unit area of 25 g/m$^2$ and a mean breaking elongation of 22.5%. The filament nonwoven fabric B is layered on the staple fiber nonwoven fabric A and then applied with a water jet stream treatment from an upper side of the filament nonwoven fabric B and from a lower side of the staple fiber nonwoven fabric A, respectively to make a composite nonwoven fabric in accordance with the present invention. The water jet stream treatment is applied at three steps by, if necessary, changing the pressure of the water jet stream. Namely, the used pressure of the water jet stream is 15 kg/cm$^2$ in a first step, 15 kg/cm$^2$ in a second step, and 30 kg/cm$^2$ in a third step. In the filament nonwoven fabric B, an area ratio of bonded portions generated by the embossing treatment is 10% for all of the area of the nonwoven fabric B.

EMBODIMENTS 2 TO 4

In those embodiments 2 to 4, a staple fiber nonwoven fabric A is directly layered on the same filament nonwoven fabric B as that used in Example 1 by using a paper-making process. Namely, a polyethylene terephthalate staple fiber having a fineness of 0.1 denier and a length of 5 mm, and a viscose rayon staple fiber having a fineness of 0.1 denier and a length of 5 mm, are dispersed with the following three composition ratios in water and stirred to form a slurry having a concentration of 0.63%. The staple fiber nonwoven fabric A having a weight per unit area of 25 g/m$^2$ is paper-made directly on the filament nonwoven fabric B to make a layered body.

Composition of Staple Fibers in nonwoven fabric A

|  | Example 2 | Example 3 | Example 4 |
|---|---|---|---|
| Staple fiber of 0.1 denier | 1 | 1 | 3 |
| Staple fiber of 1 denier | 1 | 3 | 17 |

The layered body is applied with the water jet stream treatment from an upper side and an under side of the layered body by the same method as that used in Example 1 to make composite nonwoven fabrics of Examples 2 to 4. Namely, three water jet stream treatments with pressures of 15 kg/cm$^2$ in the first step, 15 kg/cm$^2$ in the second step and 30 kg/cm$^2$ in the third step are sequentially applied from both sides of the layered body, respectively.

EXAMPLE 5

Five parts by weight of a polyethylene terephthalate staple fiber having a fineness of 0.1 denier and a length of 5 mm, seven parts by weight of a viscose rayon staple fiber having a fineness of 1 denier and a length of 5 mm and eight parts by weight of the polyethylene terephthalate staple fiber having a fineness of 0.4 denier and a length of 5 mm are dispersed in water and stirred to form a slurry having a concentration of 0.63%. A composite nonwoven fabric of Example 5 is manufactured from the slurry using the same method as that used in Examples 2 to 4.

EXAMPLE 6

A staple fiber nonwoven fabric A having a weight per unit area of 15 g/m$^2$ is obtained by paper-making a slurry having a concentration of 0.38% and prepared by mixing one part by weight of a polyester group extra-fine staple fiber having a fineness of 1 denier and a length of 5 mm and three parts by weight of a viscose rayon staple fiber having a fineness of 1 denier and a length of 5 mm in water and stirring. The obtained staple fiber nonwoven fabric A is layered on the same filament nonwoven fabric B as that used in Example 1.

The layered body is subjected three steps to the water jet stream treatment from an upper side and an underside of the layered body to make a composite nonwoven fabric of Example 6. Namely, three water jet stream treatments with pressures of 10 kg/cm$^2$ in the first step, 10 kg/cm$^2$ in the second step, and 20 kg/cm$^2$ in the third step, are sequentially applied from both sides of the layered body, respectively.

EXAMPLE 7

A staple fiber nonwoven fabric A having a weight per unit area of 40 g/m$^2$ is obtained by paper-making the same slurry as that used in Example 6, except that a concentration of the slurry is changed to 1%, and the staple fiber nonwoven fabric A is layered the same filament nonwoven fabric B as that used in Example 1.

The layered body is subjected three steps to the water jet stream treatment from an upper side and an underside of the piled body to make a composite nonwoven fabric of Example 7. Namely, three water jet stream treatments with pressures of 15 kg/cm$^2$ in the first step, 20 kg/cm$^2$ in the second step, and 30 kg/cm$^2$ in the third step are sequentially applied from both sides of the layered body, respectively.

EXAMPLES 8 to 10

Composite nonwoven fabrics of Examples 8 to 10 are manufactured using the same method as that used in Example 3, except that the following filament nonwoven fabrics B manufactured using a spun bond method are used.

Filament nonwoven fabric B in Example 8:

A polypropylene spun bond nonwoven fabric composed of filaments having a fineness of 3 denier, a weight per unit area of 25 g/m² and a mean breaking elongation of 30%, and obtained by melt spinning a polypropylene polymer to make a web and embossing the web while heating using the same method as that used in Example 1.

Filament nonwoven fabric B in Example 9:

A nylon 6 spun bond nonwoven fabric composed of filaments having a fineness of 2 denier, a weight per unit area of 25 g/m² and a mean breaking elongation of 30%, and obtained by melt spinning a nylon 6 polymer to make a web and embossing the web while heating using the same method as that used in Example 1.

Filament nonwoven fabric B in Example 10:

A polyethylene terephthalate nonwoven fabric composed of filaments having a fineness of 2 denier, a weight per unit area of 30 g/m² and a mean breaking elongation of 25%, and obtained using the same method as that used in Example 1.

EXAMPLE 11

One part by weight of a polyethylene terephthalate staple fiber having a fineness of 0.1 denier and a length of 5 mm, one part by weight of a viscose rayon staple fiber having a fineness of 1 denier and a length of 5 mm and two parts by weight of the polyethylene terephthalate staple fiber having a fineness of 1 denier and a length of 5 mm are dispersed in water and stirred to form a slurry having a concentration of 0.63%. A composite nonwoven fabric of Example 11 is manufactured from the slurry using the same method as that used in Examples 2 to 4.

EXAMPLE 12

Two parts by weight of a polyethylene terephthalate staple fiber having a fineness of 1 denier and a length of 5 mm, seven parts by weight of a viscose rayon staple fiber having a fineness of 1 denier and a length of 5 mm and one part by weight of a fibrillated acryl group pulp obtained using the following method are dispersed in water and stirred to form a slurry having a concentration of 0.63%. A composite nonwoven fabric of Example 12 is manufactured using the same method as that used in Examples 2 to 4.

The fibrillated acryl group pulp in Example 12 is manufactured using the following method.

A polymer comprising 95.0% by weight of acrylonitrile, 4.5% by weight of acrylic acid methyl ester and 0.5% by weight of methallylsulfonic acid soda, and a block type copolymer of polyethylene oxide-polypropylene oxide-polyethylene oxide having a number-average-molecular weight of 10,000 and a weight ratio of the polyethylene oxide and the polypropylene oxide of 70 to 30 are dissolved in dimethylformamide to obtain a spinning dope including 23% by weight of the acryl group polymer and 2.3% by weight of the block type copolymer. This spinning dope is kept stationary for 6 hours, and then extruded through a spinnerate to a coagulation bath including the dimethylformamide having a concentration of 75% at 35° C. to form an undrawn fiber. The undrawn fiber is washed, and subjected to a drawing operation with a drawing ratio of 12 times, and then dried in hot air at a temperature of 80° C., to form a fiber having a fineness of 1.5 denier. The obtained fibers are cut in 5 mm pieces, and 10 parts by weight of the cut fibers are dispersed in 90 parts by weight of water. This fiber dispersing liquid is supplied to a disk refiner having a disk distance of 0.1 mm and beat until the filtering degree becomes zero. The beat acryl group pulp has a number of fine beard-like fibrils made by separating same from the fiber around the surface of the portion corresponding to the trunk of the original acrylic fiber. Further the trunk of the fiber is also partially separated in a longitudinal direction thereof to make a fine fiber.

As a result of a measurement of the characteristics of the composite nonwoven fabric of Example 12, it becomes clear that the water resistance and the tensile strength of the composite nonwoven fabric can be slightly improved without lowering air permeability by using the fibrillated acryl group pulp. Further, when observing an electron micrograph of the composite nonwoven fabric of Example 12, it becomes clear that the mean orientation degrees Z of the staple fiber having a fineness of 0.3 denier or less and that of the staple fiber having a fineness of 0.5 denier or more are kept at a high level and the fibers of the fibrillated acryl group pulp are sufficiently interlaced with the staple fiber nonwoven fabric A and the filament nonwoven fabric B.

EXAMPLE 13

57% by weight of a polyethylene terephthalate staple fiber having a fineness of 0.1 denier and a length of 5 mm and 43% by weight of a viscose rayon staple fiber having a fineness of 1 denier and a length of 5 mm are dispersed in water and stirred to form a slurry having a concentration of 0.63%. A staple fiber nonwoven fabric A having a weight per unit area of 25 g/m² is obtained by paper making the slurry in an inclined wire net type paper making machine. The same filament nonwoven fabric B as that used in Example 1 is layered on the staple fiber nonwoven fabric A to make a layered body. The layered body is subjected three steps to the water jet stream treatment from an upper side and an underside of the layered body to make a composite nonwoven fabric of Example 13. Namely three water jet stream treatments with pressures of 15 kg/cm² in the first step, 15 kg/cm² in the second step, and 30 kg/cm² in the third step are sequentially applied from both sides of the layered body, respectively.

EXAMPLE 14

One part by weight of a polyethylene terephthalate staple fiber having a fineness of 0.25 denier and a length of 5 mm, and three parts by weight of a viscose rayon staple fiber having a fineness of 1 denier and a length of 5 mm are dispersed in water and stirred to form a slurry having a concentration of 0.63%. A staple fiber nonwoven fabric A having a weight per unit area of 25 g/m² is obtained by paper making the slurry in an inclined wire net type paper making machine. The same filament nonwoven fabric B as that used in Example 1 is layered on the staple fiber nonwoven fabric A to make a layered body. The layered body is subjected three steps to the water jet stream treatment from an upper side and an underside of the layered body to make a composite nonwoven fabric of Example 14. Namely three water jet stream treatments with pressures of 15 kg/cm$^2$ in the first step, 15 kg/cm$^2$ in the second step, and 30 kg/cm$^2$ in the third step are sequentially applied from both sides of the layered body, respectively.

EXAMPLE 15

One part by weight of a polyethylene terephthalate staple fiber having a fineness of 0.1 denier and a length of 5 mm, and three parts by weight of a viscose rayon staple fiber having a fineness of 0.5 denier and a length of 5 mm are dispersed in water and stirred to form a slurry having a concentration of 0.63%. A staple fiber nonwoven fabric A having a weight per unit area of 25 g/m$^2$ is obtained by paper making the slurry in an inclined wire net type paper making machine. The same filament nonwoven fabric B as that used in Example 1 is layered on the staple fiber nonwoven fabric A to make a layered body. The layered body is subjected three steps to the water jet stream treatment from an upper side and an underside of the layered body to make a composite nonwoven fabric of Example 15. Namely three water jet stream treatments with pressures of 15 kg/cm$^2$ in the first step, 15 kg/cm$^2$ in the second step, and 30 kg/cm$^2$ in the third step are sequentially applied from both sides of the layered body, respectively.

COMPARATIVE EXAMPLE 1

One part by weight of a polyethylene terephthalate staple fiber having a fineness of 0.1 denier and a length of 5 mm, and one part by weight of a viscose rayon staple fiber having a fineness of 1 denier and a length of 5 mm are dispersed in water and stirred to form a slurry having a concentration of 1%. A staple fiber nonwoven fabric A having a weight per unit area of 40 g/m$^2$ is obtained by paper making the slurry in an inclined wire net type paper making machine. A polypropylene spun bond nonwoven fabric B comprising a filament of 3 denier and having a weight per unit area of 30 g/m$^2$ and a mean breaking elongation of 85% are manufactured using the same method as that used in Example 1, and this filament nonwoven fabric B is layered in a broaden state on the staple fiber nonwoven fabric A to make a layered body. The layered body is subjected three steps to the water jet stream treatment from an upper side and an underside of the layered body to make a composite nonwoven fabric of Comparative Example 1. Namely three water jet stream treatments with pressures of 20 kg/cm$^2$ in the first step, 40 kg/cm$^2$ in the second step, and 40 kg/cm$^2$ in the third step are sequentially applied from both sides of the layered body, respectively.

COMPARATIVE EXAMPLE 2

Seven part by weight of a polyethylene terephthalate staple fiber having a fineness of 0.1 denier and a length of 5 mm, and three parts by weight of a viscose rayon staple fiber having a fineness of 1 denier and a length of 5 mm are dispersed in water and stirred to form a slurry having a concentration of 0.63%. A staple fiber nonwoven fabric A having a weight per unit area of 25 g/m$^2$ is obtained by paper making the slurry in an inclined wire net type paper making machine. The same filament nonwoven fabric B as that used in Example 1 is layered in a broaden state on the staple fiber nonwoven fabric A to make a layered body. The layered body is subjected three steps to the water jet stream treatment from an upper side and an underside of the layered body to make a composite nonwoven fabric of Comparative Example 2. Namely three water jet stream treatments with pressures of 15 kg/cm$^2$ in the first step, 15 kg/cm$^2$ in the second step, and 30 kg/cm$^2$ in the third step are sequentially applied from both sides of the layered body, respectively.

COMPARATIVE EXAMPLE 3

A composite nonwoven fabric of Comparative Example 3 is manufactured by the same method as that used in the comparative Example 2, except that the content of the polyethylene terephthalate staple fiber and the viscose rayon staple fiber is changed from seven to three to one to nine.

COMPARATIVE EXAMPLE 4

Two parts by weight of a pulp obtained by beating ALASKA PULP by a pulper for 5 minutes, and three parts by weight of a polyethylene terephthalate staple fiber having a fineness of 1 denier and a length of 5 mm are dispersed in water and stirred to form a slurry having a concentration of 0.63%. A composite nonwoven fabric of Comparative Example 4 is manufactured using the same method as that used in Comparative Example 2, except that the above slurry is used.

COMPARATIVE EXAMPLE 5

One part by weight of a polyethylene terephthalate staple fiber having a fineness of 0.1 denier and a length of 5 mm, and three parts by weight of a viscose rayon staple fiber having a fineness of 1 denier and a length of 5 mm are dispersed in water and stirred to form a slurry having a concentration of 0.18%. A staple fiber nonwoven fabric A having a weight per unit area of 7 g/m$^2$ is directly paper made from the above slurry on the same filament nonwoven fabric B as that used in Example 1 to make a layered body.

The layered body is subjected three steps to the water jet stream treatment from an upper side and an underside of the layered body to make a composite nonwoven fabric of Comparative Example 5. Namely three water jet stream treatments with pressures of 10 kg/cm$^2$ in the first step, 10 kg/cm$^2$ in the second step, and 20 kg/m$^2$ in the third step are sequentially applied from both sides of the layered body, respectively.

COMPARATIVE EXAMPLE 6

The same slurry as that used in Comparative Example 5, except that a concentration of the slurry is changed to 1.5%, is prepared. A staple fiber nonwoven fabric A having a weight per unit area of 60 g/m$^2$ is directly paper made from the above slurry on the same filament nonwoven fabric B as that used in Example 1 to make a layered body.

The layered body is subjected three steps to the water jet stream treatment from an upper side and an underside of the layered body to make a composite nonwoven fabric of Comparative Example 6. Namely three water jet stream treatments with pressures of 15 kg/cm$^2$ in the first step, 15 kg/cm$^2$ in the second step, and 30 kg/m$^2$ in the third step are sequentially applied from both sides of the layered body, respectively.

COMPARATIVE EXAMPLE 7

A composite nonwoven fabric of Comparative Example 7 is manufactured using the same method as that used in Comparative Example 6, except that the pressures of the first step, the second step and the third step of the water jet stream treatment are changed to 20 kg/cm², 40 kg/cm² and 40 kg/cm², respectively.

COMPARATIVE EXAMPLE 8

A polypropylene spun bond nonwoven fabric B comprising a filament of 3 denier and having a weight per unit area of 25 g/m² and a mean breaking elongation of 55% are manufactured using the same method as that used in Example 1.

One part by weight of a polyethylene terephthalate staple fiber having a fineness of 0.1 denier and a length of 5 mm, and three parts by weight of a viscose rayon staple fiber having a fineness of 1 denier and a length of 5 mm are dispersed in water and stirred to form a slurry having a concentration of 1.5%. A staple fiber nonwoven fabric A having a weight per unit area of 60 g/m² is directly paper made from the above slurry on the above filament nonwoven fabric B, and then composited under the same conditions as those used in Comparative Example 8.

COMPARATIVE EXAMPLE 9

One part by weight of a polyethylene terephthalate staple fiber having a fineness of 0.1 denier and a length of 5 mm, and three parts by weight of a viscose rayon staple fiber having a fineness of 1 denier and a length of 5 mm are dispersed in water and stirred to form a slurry having a concentration of 0.63%. A staple fiber nonwoven fabric A having a weight per unit area of 25 g/m² is directly paper made from the above slurry on the above filament nonwoven fabric B to form a layered body.

The layered body is subjected three steps to the water jet stream treatment from an upper side and an underside of the layered body to make a composite nonwoven fabric of comparative Example 9. Namely three water jet stream treatments with pressures of 15 kg/cm² in the first step, 15 kg/cm² in the second step, and 30 kg/cm² is the third step are sequentially applied from both sides of the layered body, respectively.

TABLE 1

| | Staple Fiber Nonwoven Fabric | | | | | | | | | Filament Nonwoven Fabric | | | Construction | | Condition of Column-like Stream Treatment | | | |
|---|---|---|---|---|---|---|---|---|---|---|---|---|---|---|---|---|---|---|
| | Staple Fiber of 0.3$^d$ or less (F) | | Staple Fiber of 0.5$^d$ or more (G) | | Others | | Weight Per Unit Area (g/m$^2$) | F + G | F/G | Fineness (d) | Mean Breaking Elongation (%) | Weight Per Unit Area (g/m$^2$) | Number of Introduced Fiber (N) | Mean Orientation Degree (Z) | Use of Wire Net | Pressure of Stream | | |
| | Fineness (d) | Ratio in Total Fibers (wt %) | Fineness (d) | Ratio in Total Fibers (wt %) | Fineness (d) | Ratio in Total Fibers | | | | | | | | | | 1st Step | 2nd Step | 3rd Step |
| Example 1 | 0.1 | 50 | 1 | 50 | — | — | 25 | 100 | 1 | 1 | 22.5 | 25 | 4 | 3.8 | Yes | 15 | 15 | 30 |
| Example 2 | 0.1 | 50 | 1 | 50 | — | — | 25 | 100 | 1 | 1 | 22.5 | 25 | 5 | 3.7 | Yes | 15 | 15 | 30 |
| Example 3 | 0.1 | 25 | 1 | 75 | — | — | 25 | 100 | 1/3 | 1 | 22.5 | 25 | 7 | 3.2 | Yes | 15 | 15 | 30 |
| Example 4 | 0.1 | 15 | 1 | 85 | — | — | 25 | 100 | 0.18 | 1 | 22.5 | 25 | 10 | 3.0 | Yes | 15 | 15 | 30 |
| Example 5 | 0.1 | 25 | 1 | 35 | 0.4 | 40 | 25 | 60 | 0.71 | 1 | 22.5 | 25 | 9 | 3.3 | Yes | 10 | 10 | 20 |
| Example 6 | 0.1 | 25 | 1 | 75 | — | — | 15 | 100 | 1/3 | 1 | 22.5 | 25 | 5 | 3.5 | Yes | 15 | 15 | 30 |
| Example 7 | 0.1 | 25 | 1 | 75 | — | — | 40 | 100 | 1/3 | 1 | 22.5 | 25 | 15 | 4.3 | Yes | 15 | 20 | 20 |
| Example 8 | 0.1 | 25 | 1 | 75 | — | — | 25 | 100 | 1/3 | 2 | 30 | 25 | 12 | 2.8 | Yes | 15 | 15 | 30 |
| Example 9 | 0.1 | 25 | 1 | 75 | — | — | 25 | 100 | 1/3 | 1 | 30 | 20 | 15 | 2.7 | Yes | 15 | 15 | 30 |
| Example 10 | 0.1 | 25 | 1 | 75 | — | — | 25 | 100 | 1/3 | 1 | 25 | 20 | 10 | 3.3 | Yes | 15 | 15 | 30 |
| Example 11 | 0.1 | 25 | 1 | 25 | 1 fibrillated pulp | 50 | 25 | 100 | 1 | 1 | 22.5 | 25 | 12 | 3.1 | Yes | 15 | 15 | 30 |
| Example 12 | 0.1 | 20 | 1 | 70 | — | 10 | 25 | 90 | 0.29 | 1 | 22.5 | 25 | 8 | 3.4 | Yes | 15 | 15 | 30 |
| Example 13 | 0.1 | 57 | 1 | 43 | — | — | 25 | 100 | 1.33 | 1 | 22.5 | 25 | 5 | 4.0 | Yes | 15 | 15 | 30 |
| Example 14 | 0.25 | 25 | 1 | 75 | — | — | 25 | 100 | 1/3 | 1 | 22.5 | 25 | 6 | 3.3 | Yes | 15 | 15 | 30 |
| Example 15 | 0.1 | 25 | 0.5 | 75 | — | — | 25 | 100 | 1/3 | 1 | 22.5 | 25 | 7 | 3.4 | Yes | 15 | 15 | 30 |
| Comparative Example 1 | 0.1 | 50 | 1 | 50 | — | — | 40 | 100 | 1 | 3 | 85 | 30 | 50 | 1.1 | No | 20 | 40 | 40 |
| Comparative Example 2 | 0.1 | 70 | 1 | 30 | — | — | 25 | 100 | 7/3 | 1 | 22.5 | 25 | 10 | 3.5 | Yes | 15 | 15 | 30 |
| Comparative Example 3 | 0.1 | 10 | 1 | 90 | — | — | 25 | 100 | 1/9 | 1 | 22.5 | 25 | 8 | 3.2 | Yes | 15 | 15 | 30 |
| Comparative Example 4 | — | — | 1 | 40 | pulp | 60 | 25 | 40 | 0 | 1 | 22.5 | 25 | 18 | 2.1 | Yes | 15 | 10 | 30 |
| Comparative Example 5 | 0.1 | 25 | 1 | 75 | — | — | 7 | 100 | 1/3 | 1 | 22.5 | 25 | 25 | 1.8 | Yes | 10 | 10 | 20 |
| Comparative Example 6 | 0.1 | 25 | 1 | 75 | — | — | 60 | 100 | 1/3 | 1 | 22.5 | 25 | 3 | 12 | Yes | 15 | 15 | 30 |
| Comparative Example 7 | 0.1 | 25 | 1 | 75 | — | — | 60 | 100 | 1/3 | 3 | 22.5 | 25 | 40 | 2.0 | No | 20 | 40 | 40 |
| Comparative Example 8 | 0.1 | 25 | 1 | 75 | — | — | 25 | 100 | 1/3 | 1 | 55 | 25 | 30 | 2.1 | Yes | 15 | 15 | 30 |
| Comparative Example 9 | 0.1 | 25 | 1 | 75 | — | — | 25 | 100 | 1/3 | 1 | 22.5 | 25 | 22 | 1.8 | No | 15 | 15 | 30 |

TABLE 2

| | Total Weight Per Unit Area (g/m²) | Thickness (mm) | Bending Hardness (gcm²/cm) | | Air Perpeability (cc/cm²·sec) | Strength (kg/3cm) | | Elongation (%) | | Water resisting pressure (mmH₂O) | Mason Jar Test (min) | Resistance to Liquid Leakage at Deformation (number of time) |
|---|---|---|---|---|---|---|---|---|---|---|---|---|
| | | | Longitudinal Direction | Traverse Direction | | Longitudinal Direction | Traverse Direction | Longitudinal Direction | Traverse Direction | | | |
| Example 1 | 50 | 0.31 | 0.09 | 0.06 | 58 | 6.0 | 2.7 | 25 | 42 | 380 | 60 or more | 5 |
| Example 2 | 50 | 0.31 | 0.09 | 0.06 | 60 | 6.0 | 2.7 | 26 | 40 | 370 | 60 or more | 5 |
| Example 3 | 50 | 0.32 | 0.08 | 0.06 | 90 | 6.2 | 2.9 | 28 | 40 | 300 | 60 or more | 5 |
| Example 4 | 50 | 0.33 | 0.08 | 0.06 | 130 | 6.4 | 3.0 | 30 | 40 | 270 | 60 or more | 5 |
| Example 5 | 50 | 0.33 | 0.09 | 0.06 | 95 | 6.4 | 3.2 | 30 | 40 | 290 | 60 or more | 5 |
| Example 6 | 40 | 0.28 | 0.06 | 0.05 | 200 | 5.7 | 2.5 | 22 | 34 | 250 | 60 or more | 5 |
| Example 7 | 65 | 0.37 | 0.14 | 0.07 | 50 | 7.8 | 4.5 | 35 | 50 | 450 | 60 or more | 5 |
| Example 8 | 50 | 0.34 | 0.07 | 0.05 | 80 | 6.2 | 2.5 | 30 | 55 | 280 | 60 or more | 5 |
| Example 9 | 45 | 0.34 | 0.07 | 0.03 | 75 | 6.9 | 3.3 | 35 | 55 | 270 | 60 or more | 5 |
| Example 10 | 55 | 0.35 | 0.14 | 0.07 | 80 | 8.0 | 5.4 | 30 | 45 | 330 | 60 or more | 5 |
| Example 11 | 50 | 0.34 | 0.10 | 0.07 | 80 | 7.0 | 3.5 | 30 | 40 | 290 | 60 or more | 5 |
| Example 12 | 50 | 0.34 | 0.12 | 0.09 | 85 | 6.5 | 3.0 | 27 | 38 | 290 | 60 or more | 5 |
| Example 13 | 50 | 0.31 | 0.09 | 0.06 | 45 | 6.0 | 2.6 | 25 | 41 | 415 | 60 or more | 5 |
| Example 14 | 50 | 0.33 | 0.10 | 0.07 | 98 | 6.4 | 3.2 | 30 | 42 | 270 | 60 or more | 4 |
| Example 15 | 50 | 0.31 | 0.07 | 0.05 | 50 | 6.0 | 2.8 | 27 | 40 | 330 | 60 or more | 5 |
| Comparative Example 1 | 70 | 0.33 | 0.20 | 0.11 | 40 | 7.5 | 3.8 | 80 | 120 | 185 | 1 | 1 |
| Comparative Example 2 | 50 | 0.31 | 0.11 | 0.08 | 20 | 5.8 | 3.0 | 30 | 42 | 450 | 60 or more | 5 |
| Comparative Example 3 | 50 | 0.37 | 0.08 | 0.06 | 90 | 6.6 | 3.2 | 30 | 45 | 200 | 10 | 1 |
| Comparative Example 4 | 50 | 0.28 | 0.15 | 0.10 | 20 | 6.5 | 3.3 | 30 | 45 | 230 | 50 | 2 |
| Comparative Example 5 | 32 | 0.22 | 0.06 | 0.04 | 220 | 5.3 | 2.1 | 20 | 30 | 190 | 5 | 1 |
| Comparative Example 6 | 85 | 0.57 | 0.13 | 0.08 | 10 | 6.5 | 3.0 | 28 | 45 | 250 | 60 or more | 4 |
| Comparative Example 7 | 85 | 0.36 | 0.27 | 0.15 | 30 | 9.0 | 5.4 | 35 | 50 | 200 | 10 | 1 |
| Comparative Example 8 | 50 | 0.37 | 0.05 | 0.03 | 100 | 5.8 | 2.8 | 24 | 40 | 220 | 50 | 2 |
| Comparative Example 9 | 50 | 0.35 | 0.07 | 0.03 | 95 | 6.0 | 3.4 | 32 | 45 | 220 | 50 | 2 |

Table 1 shows constitutions of the composite nonwoven fabric of Examples 1 to 15 and Comparative Examples 1 to 9, and Table 2 shows characteristics of the composite nonwoven fabric. As shown in Table 2, the composite nonwoven fabric of Examples 1 to 15 has superior air permeability, extremely high water resistance and an acceptable value i.e., 60 minutes or more in a Mason jar. And the liquid barrier properties and the bacterium barrier properties are also superior. Further, since resistance to liquid leakage as a result of deformations caused by bending or compression forces is superior, the composite nonwoven fabric has a superior ability to prevent permeation of blood as a result of, for example, compression of am operator while on an operating table, and the composite nonwoven fabric does not accumulate moisture because of superior air permeability, and strength and flexibility of the composite nonwoven fabric are superior.

The above features of the composite nonwoven fabric in accordance with the present invention can be clarified by comparing same with the characteristics of the composite nonwoven fabric of Comparative Examples 1 to 9. For example, the values of N are large, but the values of the mean orientation degree is small in Comparative Examples 1, 4, 5, 7, 8 and 9. The proportion of a staple fiber having a fineness of 0.3 denier or more in staple fiber nonwoven fabric A is large in Comparative Example 2, and is small in Comparative Example 3, accordingly, the former has inferior air permeability and the latter has inferior water resistance. Further since the weight per unit area of a staple fiber nonwoven fabric A is excessive in the composite nonwoven fabric of Comparative Example 6, air permeability is inferior and interlacement between the staple fiber nonwoven fabric A and a filament nonwoven fabric B is not sufficient in this composite nonwoven fabric.

An apparent density of the stable fiber nonwoven fabrics A in Examples 1 to 15 is 0.1 g/cm³ or less. While the staple fiber nonwoven fabric A having a small value of the mean orientation degree Z in Comparative Examples 1, 5 and 9 has an apparent density of under 0.1 g/cm³.

The composite nonwoven fabric in accordance with the present invention can be used for medical application such as surgical wear, sheets, a drape, a mask or the like, and further can be used for a top sheet of a physiological napkin and a diapers, filters, wall paper, the base substrate of artificial leather or the like.

We claim:

1. A composite nonwoven fabric comprising a staple fiber nonwoven fabric (A) having the following constitutions (1) to (3) and a filament nonwoven fabric (B) formed such that filaments are partially bonded with each other, wherein a part of the staple fibers constituting the staple fiber nonwoven fabric (B) and interlaced with the filaments constituting the filament nonwoven fabric (B) so as to produce a layered body of the staple fiber nonwoven fabric (A) and the filament nonwoven fabric (B), and the number N of the staple fibers inserted to a depth of one to two or more of the thickness of the filament nonwoven fabric (B) in a region having a length of 500 μm in an optional cross section of the composite nonwoven fabric is 20 or less;
    (1) $F+G \geqq 50\%$ by weight
    $1/7 \leqq F/G \leqq 4/3$
wherein
    F: ratio of a staple fiber having a fineness of 0.3 denier or less in all the staple fibers
    G: ratio of a staple fiber having a fineness of 0.5 denier or more in all the staple fibers
    (2) Weight per unit area: 10 g/m² to 40 g/m²
    (3) Mean orientation degree (Z) of the staple fibers: 2.0 to 10.

2. A composite nonwoven fabric according to claim 1, wherein an apparent density of the staple fiber nonwoven fabric (A) is 0.1 g/cm² or more.

3. A composite nonwoven fabric according to claim 1, wherein a mean elongation of the filament nonwoven fabric (B) is 40% or less; wherein;
    the mean elongation is a value obtained by averaging breaking elongations measured in two mutual perpendicular directions.

4. A composite nonwoven fabric according to claim 1, wherein the staple fiber nonwoven fabric (A) is composed of at least a regenerated cellulose group fiber and the ratio of the regenerated cellulose group fiber is 50% by weight or more and 80% by weight or less.

5. A composite nonwoven fabric according to claim 1, wherein the staple fiber nonwoven fabric (A) is composed of a regenerated cellulose group fiber and a polyester group fiber, and the ratio of the polyester group fiber is one to three or more and one or less against the regenerated cellulose group fiber.

6. A composite nonwoven fabric according to claim 1, wherein the staple fiber nonwoven fabric (A) is composed of at least a fibrillated acrylic group pulp, and the ratio of the fibrillated acrylic group pulp is 5% by weight or more and 15% by weight or less.

* * * * *

UNITED STATES PATENT AND TRADEMARK OFFICE
CERTIFICATE OF CORRECTION

PATENT NO. : 5,298,315
DATED : March 29, 1994
INVENTOR(S) : Minoru Fukui et al.

It is certified that error appears in the above-identified patent and that said Letters Patent is hereby corrected as shown below:

Claim 1, col. 22, line 6, after "nonwoven fabric", insert --(A) are inserted into the filament nonwoven fabric--.

Claim 2, col. 22, line 27, "0.1 $g/cm^2$" should read --0.1 $g/cm^3$--.

Signed and Sealed this

Second Day of August, 1994

Attest:

BRUCE LEHMAN

Attesting Officer         Commissioner of Patents and Trademarks